(12) United States Patent
Steiner

(10) Patent No.: US 10,870,455 B2
(45) Date of Patent: Dec. 22, 2020

(54) TRACK LINK FOR A TRACK JOINT ASSEMBLY HAVING WEAR BAND WITH LENGTHWISE-VARIED HARDNESS

(71) Applicant: Caterpillar Inc., Deerfield, IL (US)

(72) Inventor: Kevin Steiner, Tremont, IL (US)

(73) Assignee: Caterpillar Inc., Peoria, IL (US)

( * ) Notice: Subject to any disclaimer, the term of this patent is extended or adjusted under 35 U.S.C. 154(b) by 172 days.

(21) Appl. No.: 16/128,455

(22) Filed: Sep. 11, 2018

(65) Prior Publication Data
US 2020/0079446 A1    Mar. 12, 2020

(51) Int. Cl.
| | | |
|---|---|---|
| *B62D 55/20* | (2006.01) | |
| *B62D 55/21* | (2006.01) | |
| *C21D 1/42* | (2006.01) | |
| *C21D 9/04* | (2006.01) | |

(52) U.S. Cl.
CPC ............ *B62D 55/202* (2013.01); *B62D 55/21* (2013.01); *C21D 1/42* (2013.01); *C21D 9/04* (2013.01)

(58) Field of Classification Search
CPC ...... B62D 55/21; B62D 55/202; B62D 55/26; B62D 55/32; C21D 1/42; C21D 9/04
See application file for complete search history.

(56) References Cited

U.S. PATENT DOCUMENTS

| | | |
|---|---|---|
| 3,955,855 A | 5/1976 | Massieon et al. |
| 7,338,138 B2 | 3/2008 | Sho et al. |
| 9,045,180 B2 | 6/2015 | Brewer et al. |
| 9,290,217 B2 | 3/2016 | Steiner et al. |
| 9,550,537 B2 | 1/2017 | Caterpillar |
| 2003/0230069 A1* | 12/2003 | Okawa .................. B62D 55/32 59/35.1 |
| 2015/0008730 A1 | 1/2015 | Steiner et al. |
| 2016/0137239 A1 | 5/2016 | Steiner et al. |

OTHER PUBLICATIONS

WIPO Office, International Search Report for PCT/US2019/050299. Authorized Officer Andras Szaip, Not yet published, Publisher will be WIPO Office, Entire Document.

* cited by examiner

*Primary Examiner* — Kip T Kotter
(74) *Attorney, Agent, or Firm* — Jonathan F. Yates

(57) ABSTRACT

A track link for a ground-engaging track system includes an elongate link body having an upper rail surface located in part upon each of a first link strap, a second link strap, and a middle section of the track link. The upper rail surface is formed by a wear band of sacrificial wear material having a hardness that is varied lengthwise along the upper rail surface to retard scalloping of the track link during service and forming relatively softer zones in the first and second link straps and a relatively harder zone within the middle section. Methodology for making such a track link is also disclosed.

19 Claims, 4 Drawing Sheets

TRACK LINK FOR A TRACK JOINT ASSEMBLY HAVING WEAR BAND WITH LENGTHWISE-VARIED HARDNESS

TECHNICAL FIELD

The present disclosure relates generally to ground-engaging track systems and components and, more particularly, to a track link with a wear band of sacrificial wear material having a hardness varied lengthwise along an upper rail surface to retard scallop formation in the track link during service.

BACKGROUND

A wide variety of machines utilize tracks as ground-engaging propulsion elements, notably track-type tractors. Such tracks typically include a plurality of rotatable track-engaging elements, with each of two tracks at opposite sides of the machine forming endless loops of links moved about rotating components during operation. Two chains of coupled-together links, with bolted-on track shoes, and the chains held together by way of track pins, is a typical configuration. The demands placed upon such machines and their associated tracks can be quite substantial with extremely high torsional loads, shearing loads, impacts, and still others. Machine tracks are commonly fairly robust to provide an operating life of thousands of hours despite significant stresses, strain, and wear.

Understanding and addressing wear phenomena in machine tracks has received considerable engineering attention in recent years. The various wear phenomena and wear rates experienced by machine track are typically a result of how the machine is used, the skill and experience of the operator, and both the particular underfoot conditions and substrate materials in the operating environment. Machines operated in sandy materials tend to wear certain components relatively more rapidly than machines used in less sandy and more earthen environments, for example. Field service life of machine track can vary based upon the factors mentioned above. Since machine track components can be relatively expensive to service and replace, not to mention the negatives of machine downtime, engineering efforts in this field have often centered around reducing and managing wear between and among components. U.S. Pat. No. 3,955,855 to Massieon et al. is directed to a track-type machine having track links with contact surfaces formed of material that is relatively more wear-resistant than base material. The material is apparently a composite alloy metallurgically bonded to a base material of the track links.

SUMMARY OF THE INVENTION

In one aspect, a track link for a ground-engaging track system in a machine includes an elongate link body with a first link strap having a track pin bore formed therein, a second link strap having a bushing bore formed therein, and a middle section connecting between the first link strap and the second link strap. The elongate link body further includes a lower shoe-mounting surface, and an upper rail surface, the upper rail surface being located in part upon each of the first link strap, the second link strap, and the middle section, and formed by a wear band of sacrificial wear material. The sacrificial wear material has a hardness that is varied lengthwise along the upper rail surface to form a first relatively softer zone located in the first link strap, a second relatively softer zone located in the second link strap, and a relatively harder zone located at least in part within the middle section.

In another aspect, a track joint assembly for a ground-engaging track system in a machine includes a first track link, a second track link, and a track pin coupling the first track link to the second track link. Each of the first track link and the second track link includes a first link strap having a track pin bore formed therein, a second link strap having a bushing bore formed therein, and a middle section connecting between the first link strap and the second link strap. Each of the first and the second track links further includes a lower shoe-mounting surface, and an upper rail surface. The upper rail surface is located in part upon each of the corresponding first link strap, second link strap, and middle section, and is formed by a wear band of sacrificial wear material. The sacrificial wear material has a hardness that is varied lengthwise along the upper rail surface of the corresponding first or second track link to form a first relatively softer zone located in the first link strap, a second relatively softer zone located in the second link strap, and a relatively harder zone located at least in part within the middle section.

In still another aspect, a track link for a ground-engaging track system in a machine is made according to a method that includes heat treating an elongate link body having a first link strap, a second link strap, a middle section, and an upper rail surface; such that a material extending throughout the elongate link body is hardened. The method further includes tempering the elongate link body such that a portion of the material that forms the upper rail surface is softened. The method still further includes forming, by way of the heat treating and the tempering of the elongate link body, a scallop-retarding pattern of material hardness that is varied lengthwise along the upper rail surface to form relatively softer zones in each of the first and the second link straps, and a relatively harder zone in the middle section.

DETAILED DESCRIPTION

Figure 1:
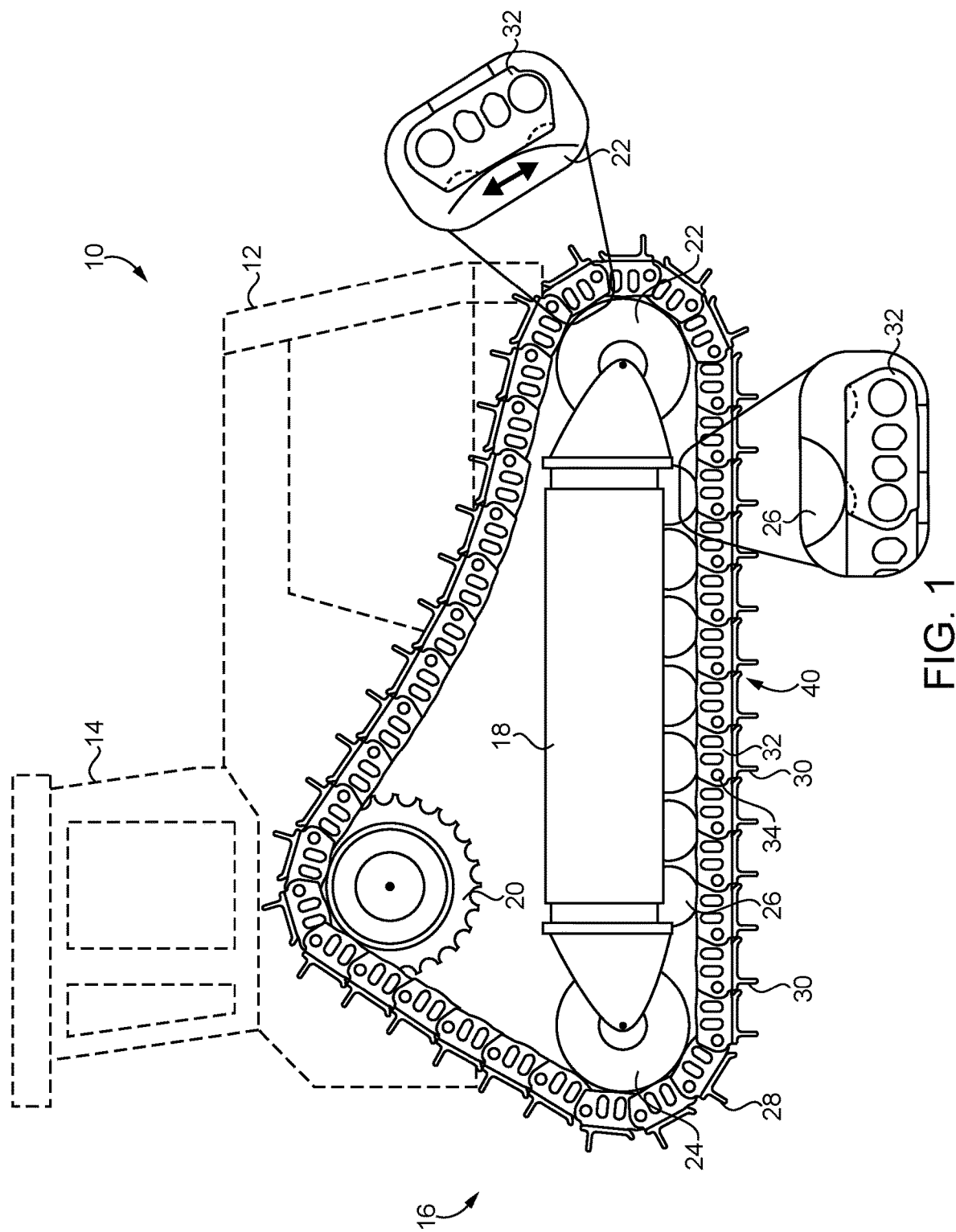
FIG. 1 is a side diagrammatic view of a machine having a ground-engaging track system, and including detailed enlargements, according to one embodiment.

Referring to FIG. 1, there is shown a ground-engaging machine 10 (hereinafter "machine 10") including a frame or body 12 having an operator cab 14, according to one embodiment. Machine 10 includes a ground-engaging track system 16 (hereinafter "track system 16"), having a track roller frame 18, a drive sprocket 20, a front idler 22, and a back idler 24. A track 28 extends about drive sprocket 20 and each of front idler 22 and back idler 24, as well as a plurality of track rollers 26. It will be understood that track 28 and track roller frame 18 are positioned at a first side of frame 12, while machine 10 includes a second track roller frame and a second track positioned upon an opposite side of frame 12 and structured substantially identically to that depicted in FIG. 1. Those skilled in the art will also recognize the so-called "high-drive configuration" of track system 16. It will be appreciated that other track configurations such as an oval track could fall within the scope of the present disclosure. Machine 10 is shown in the context of a track-type tractor but could be any of a variety of other machines such as a track loader, a half-track machine, or still another off-highway piece of equipment. FIG. 1 also includes a detailed enlargement illustrating a pattern of contact between front idler 22 and a track link 32 that might be observed in track system 16. Another detailed enlargement illustrates a pattern of contact between a track roller 26 and a track link 32 that might also be observed. Sliding contact with rotatable track-engaging elements such as front idler 22 or back idler 24 can cause "scalloping" of track link 32. Sliding and/or rolling contact between track roller 26 and track link 32 can be associated with other wear phenomena. As will be further apparent from the following description, track system 16 is uniquely configured to address certain wear phenomena and thus extend track service life over known designs.

Figure 2:
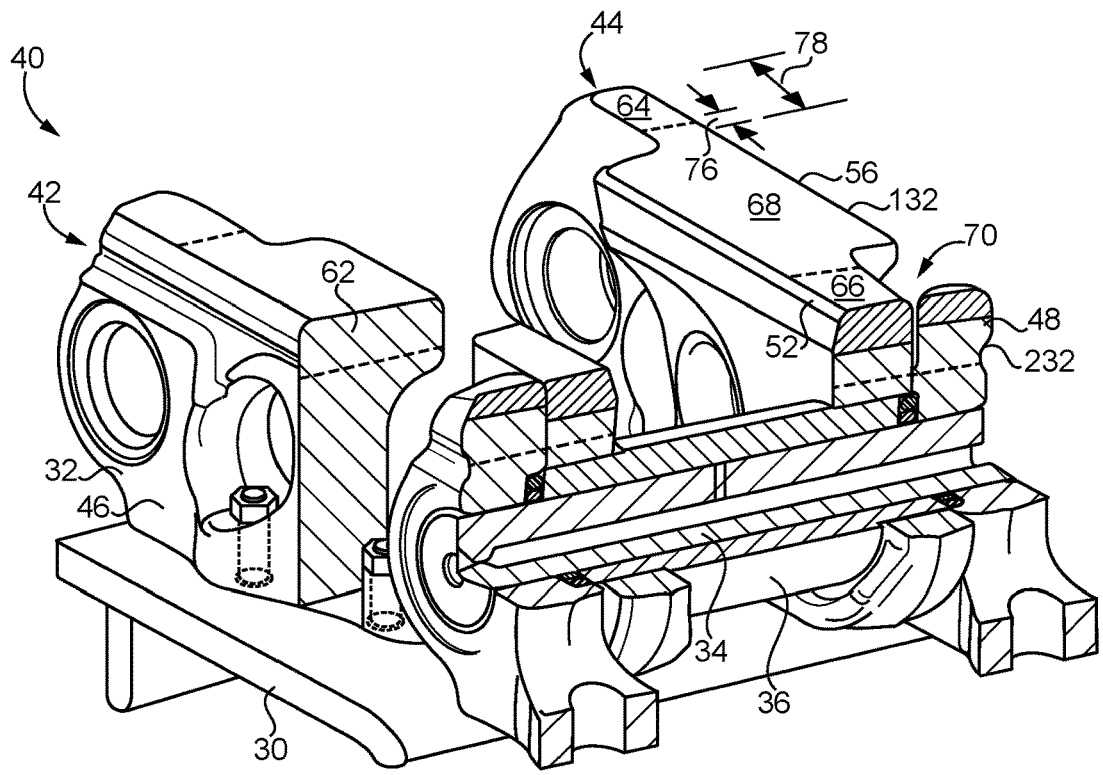
FIG. 2 is a sectioned diagrammatic view, in multiple section planes, of a track joint assembly, according to one embodiment.
Figure 3:
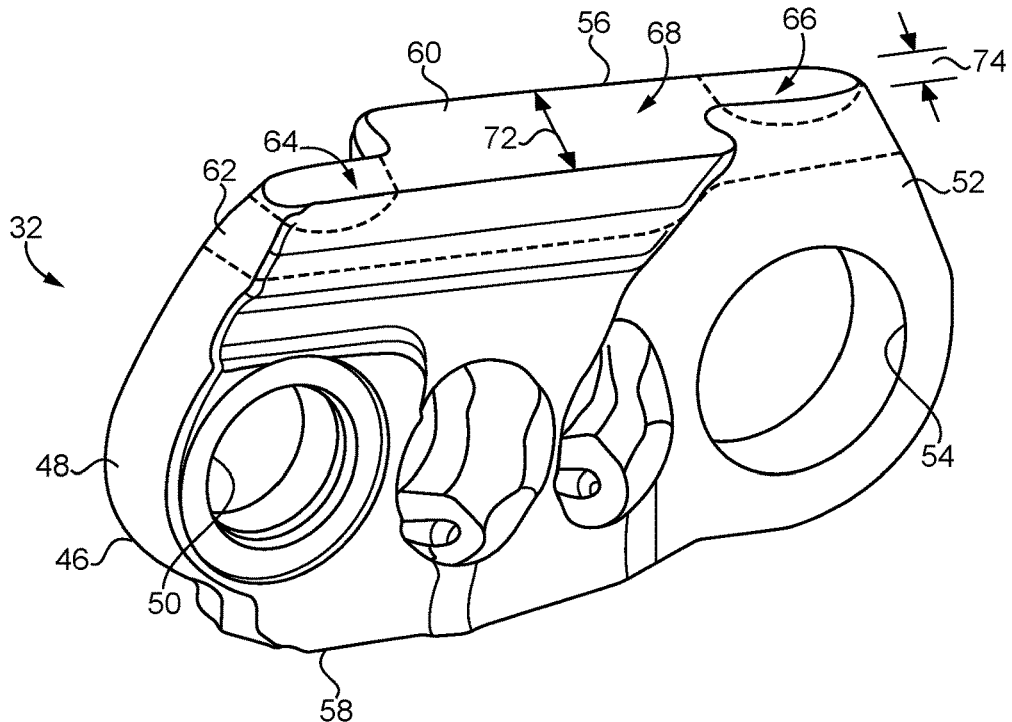
FIG. 3 is a diagrammatic view of a track link, according to one embodiment.

Track 28 includes a plurality of track links 32 that extend about the various rotatable track-engaging elements in an endless loop. A plurality of track shoes 30 are coupled to track links 32, such as by bolting in a generally conventional manner. Track links 32 may be coupled together by a plurality of track pins 34 to form a plurality of track joint assemblies 40. Referring also now to FIG. 2 and FIG. 3, it can be seen that a plurality of track links 32 are coupled together by way of track pin 34 to form a first track chain 42. Another plurality of track links, and in the FIG. 2 illustration including a first track link 132 and a second track link 232, are coupled together by way of track pin 34 to form another track chain 44. Track pin 34 and the other track pins couple together track chain 42 and 44 themselves. A bushing 36, which can include a rotatable lubricated bushing, is positioned upon track pin 34 in a generally conventional manner. It should be understood that the terms "first" and "second" are used for convenience, and any of the track links depicted in the drawings and discussed herein could be understood as a "first" track link or a "second" track link, et. cetera, depending upon perspective. It can also be noted from FIG. 2 that track links 32 in track chain 42 are mirror images of track links 132 and 232 in track chain 44. Description herein and depiction in the drawings of any individual feature of any one track link can be understood by way of analogy to refer to any of the other track links in track system 16, or otherwise within the scope of the present disclosure. Moreover, discussion of a track link in the singular or the plural is used for purposes of convenience and is not in any sense intended to be limiting.

Track link 32 includes an elongate link body 46 having a first link strap 48 with a track pin bore 50 formed therein, a second link strap 52 having a bushing bore 54 formed therein, and a middle section 56 connecting between first link strap 48 and second link strap 52. The sizes of track pin bore 50 and bushing bore 54 might be different or the same, depending on track design. In an implementation, bushing bore 54 is larger, to accommodate the relatively larger bushing 36 compared to track pin 34. Elongate link body 46 further includes a lower shoe-mounting surface 58, and an upper rail surface 60. Upper rail surface 60 is located in part upon each of first link strap 48, second link strap 52, and middle section 56. Upper rail surface 60 is formed by a wear hand 62 of sacrificial wear material, including a metallic iron or steel material, for instance, of which elongate link body 46 is made. The properties of the sacrificial wear material can vary within elongate link body 46, however, so as to retard scalloping or other types of track link wear as further discussed herein.

The sacrificial wear material has a hardness that is varied lengthwise along upper rail surface 60 to form a first relatively softer zone 64 located in first link strap 48, a second relatively softer zone 66 located in second link strap 52, and a relatively harder zone 68 located at least in part within middle section 56. In the illustrated embodiment upper rail surface 60 is flat. It will also be noted that first link strap 48 is laterally offset from second link strap 52 such that elongate link body 46 forms an S-pattern. Track links 32 in track chain 42 can be understood to form a right-handed S-pattern, whereas track links 132, 232, in track chain 44 can be understood to form a left-handed. S-pattern. Those skilled in the art will be familiar with "S-shaped" links, the literal shape of which can be thought of as a somewhat squished-down S or Z. The terms "left-handed" and "right-handed" are used herein in a relative sense and refer to the typically mirror image relationship of track links in the respective track chains, Thus, depending upon perspective the track links in either one of track chains 42 and 44 could be considered one of left-handed or right-banded, with the track links in the other of track chains 42 and 44 considered the other of left-handed or right-handed.

The detailed enlargement of FIG. 1 illustrating a pattern of contact between track roller 26 and track link 32 shows track roller 26 contacting track link 32 at a location that is inboard of one of the ends of track link 32. In FIG. 2 it can be seen that a gap 70 extends between first link strap 48 of track link 232 and middle section 56 of track link 132. The relatively harder zone 68 of track link 132 extends into its corresponding second link strap 52 such that relatively harder sacrificial wear material of track link 132 is located laterally adjacent to gap 70. The detailed enlargement showing the pattern of contact of track roller 26 with track link 32 in FIG. 1 depicts track roller 26 as it might appear in contact with second link strap 52 adjacent to gap 70, such that only upper rail surface 60 of a total of one link strap of one track link is contacted at that moment.

With reference to FIG. 3 in particular, a roller contact width 72 of upper rail surface 60 in middle section 56 can be seen to be about twice a roller contact width 74 of upper rail surface 60 in each of first and second link straps 48 and 52. As a result, as track roller 26, and the other track rollers, roll along track chains 42 and 44, track rollers 26 will travel across portions of upper rail surfaces 60 in track chains 42 and 44 that are relatively narrow in an alternating manner with portions of upper rail surfaces 60 that are relatively wide. Once track roller 26 advances past gap 70 it will contact upper rail surfaces 60 of link straps in two track links, or the upper rail surface in the middle section of one track link. Relatively harder zone 68 can extend into each of first link strap 48 and second link strap 52 such that during those times when track roller 26 is in contact with, and thus wearing against, only roller contact width 74 in each of track chains 42 and 44, track roller 26 will contact relatively harder sacrificial wear material of relatively harder zone 68. Relatively harder zone 68 may be continuous and pervasive upon the portion of upper rail surface 60 within middle section 56, and extend into the portions of upper rail surface 60 that are on each of first link strap 48 and second link strap 52. Relatively harder sacrificial wear material of relatively harder zone 68 will in any event typically form the junctions between middle section 56 and each of link straps 48 and 52 at least upon upper rail surface 60. As depicted in FIG. 2, a lengthwise extent 76 of relatively harder zone 56 within each of first link strap 48 and second link strap 52 may be about 20% or less, potentially about 10% or less, of a full length 78 of upper rail surface 60 within the corresponding first or second link strap 48 or 52. Another way to understand this feature is that about 20% or less of the available surface area for roller contact within the portions of upper rail surface 60 on link straps 48 and 52 may be formed by relatively harder material, with the remainder being formed by relatively softer material in at least some embodiments.

From the foregoing description it will be appreciated that hardness of sacrificial wear material that is to be worn away during service is varied lengthwise along upper rail surface 60. In a practical implementation, hardness of the sacrificial wear material may be varied depthwise from upper rail surface 60 within wear band 62. It can be noted from FIG. 3 that each of first lower hardness zone 64 and second lower hardness zone 66 has a trough shape. The trough shape formed by relatively softer sacrificial wear material can be understood to produce a greatest depth of sacrificial wear material approximately over centers of track pin bore 50 and bushing bore 54, in the illustrated embodiment. The depth of the relatively softer sacrificial wear material, and thus depths of relatively softer zones 64 and 66, may be less in directions toward middle section 56 and also less in directions toward outer ends of elongate link body 42. In other embodiments the depths of zones 64 and 66 might be uniform, or zones 64 and 66 might have a shape other than a trough such as a linear or curvilinear slope toward or away from middle section 56, or a compound shape of multiple troughs or the like.

Figure 6:
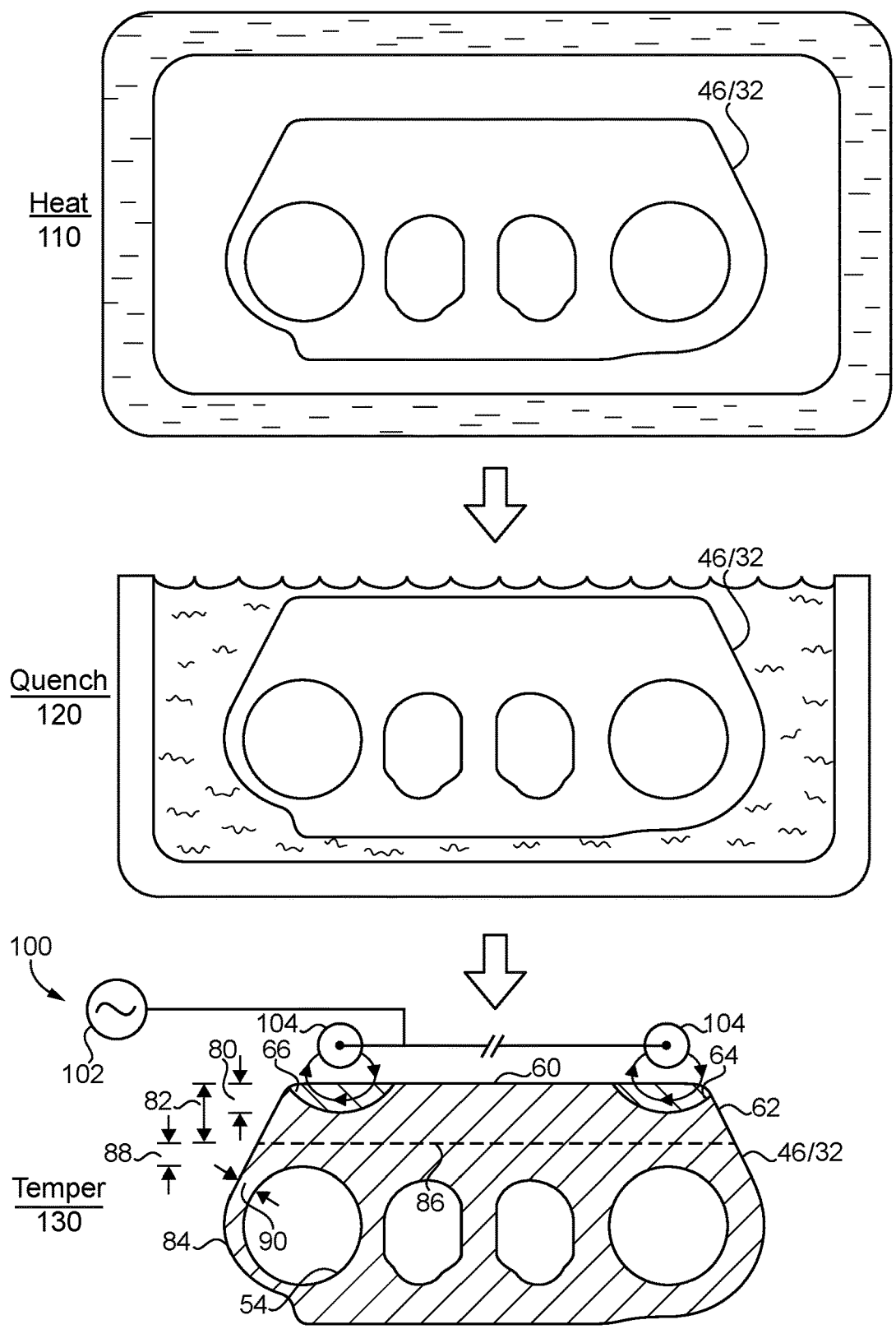
FIG. 6 illustrates stages in making a track link, and structural features of the track link, according to one embodiment.

Referring also now to FIG. 6, there is diagrammatically shown stages and methodology for making track link 32 according to the present disclosure. Making track link 32 can include heat treating elongate link body 46 such that material, extending throughout elongate link body 46, is hardened. As noted above, material of which elongate link body 46 is made can include an iron or a steel. In FIG. 6 an initial heat stage 110 can include placing a cast or forged elongate link body 46 within a furnace or the like for a period of time sufficient to heat elongate link body 46 substantially uniformly. Heat treat temperatures and process conditions to achieve hardness and other material properties suitable for application in the present context are routine. From heat stage 110 processing can advance to a quench stage 120 where elongate link body 46 is liquid quenched, again according to routine techniques. Heat treating elongate link body 46 by way of heat stage 110 and quench stage 120 can include hardening material extending throughout elongate link body 46 to a hardness greater than 50 HRC (Rockwell C Hardness Scale). The material extending throughout elongate link body 46 may have a hardness after quench stage 120 of about 55 HRC or greater. As used herein, the term "about" can be understood in the context of conventional rounding to a consistent number of significant digits. Accordingly, "about 50" means from 49.5 to 50.4, "about 55" means from 54.5 to 55.4, and so on.

From quench stage 120 processing can advance to a temper stage 130 where a tempering apparatus 100 including a power supply 102 and electromagnetic induction heating elements 104 is shown. Heating elements 104 can be positioned in proximity to elongate link body 46 to selectively temper elongate link body 46 according to known induction tempering techniques and parameters, such that a portion of the material that forms upper rail surface 60 is softened. The portion of material that is softened may be only that portion that forms upper rail surface 60 within part, most, or all of first link strap 48 and second link strap 52, with the tempering performed to retain the increased hardness of material within the portions of upper rail surface 60 that adjoin middle section 56 as described herein. Put differently, the tempering can be limited to less than all of the exposed upper rail surface 60, such that 10%, 20%, et cetera, as described herein remains at a full hardness. Field concentrators or other apparatus and techniques can be used to provide the desired selectiveness of the softening of material. Tempering of elongate link body 46 can include softening the subject material to a hardness less than 50 HRC. The softening can further include softening the subject material to a hardness of about 45 HRC or less.

The processing stages depicted in FIG. 6 enable forming, by way of the heat treating and the tempering of elongate link body 46, a scallop-retarding pattern of material hardness that is varied lengthwise along upper rail surface 60 to form relatively softer zones 64 and 66 in each of link straps 48 and 52, and relatively harder zone 68 in middle section 56. It should further be appreciated that the tempering of elongate link body 46 can be understood to soften the portion of material that forms upper rail surface 60 from the hardness greater than 50 HRC that is obtained by way of heat stage 110 to the hardness less than 50 HRC as discussed herein. Such an approach differs from techniques, for example, where a link body was hardened in its entirety, then softened in its entirety, then selectively hardened along the upper rail surface. It will thus be appreciated that at least in certain applications the present disclosure can enable a reduced number of processing steps as compared to known techniques. FIG. 6 depicts electromagnetic induction tempering of upper rail surface 60 within first and second link straps 48 and 52, however, other tempering or material softening techniques might be used. Track pin bore 50 and bushing bore 54 could also be tempered such that material forming the respective bores has a relatively lesser hardness suitable for machining, such as about 45 HRC or less. In still other embodiments, however, the material forming bores 50 and 54 could be maintained at greater than 50 HRC and final machined with suitable equipment at that higher hardness obtained from heat stage 110 and quench stage 120.

Also depicted in FIG. 6 are certain other features of elongate link body 46. Second link strap 52 can include an end band 84 shown in FIG. 6, and wear band 62 may extend downward to a boundary 86 that is spaced a distance 88 from bushing bore 54 that is substantially equal to a thickness 90 of end band 84. In other words, the lower boundary 86 of wear band 62 might be spaced from bushing bore 54 a distance that is no less than a material thickness of elongate link body 46 at end band 84. Each of first lower hardness zone 64 and second lower hardness zone 66 may define a trough depth 80 from upper rail surface 60 that is about 50% or less of a depth 82 of boundary 86 from upper rail surface 60. Another way to understand these features is that the softened material of lower hardness zones 64 and 66 extends about halfway or less depthwise through wear band 62.

INDUSTRIAL APPLICABILITY

Figure 4:
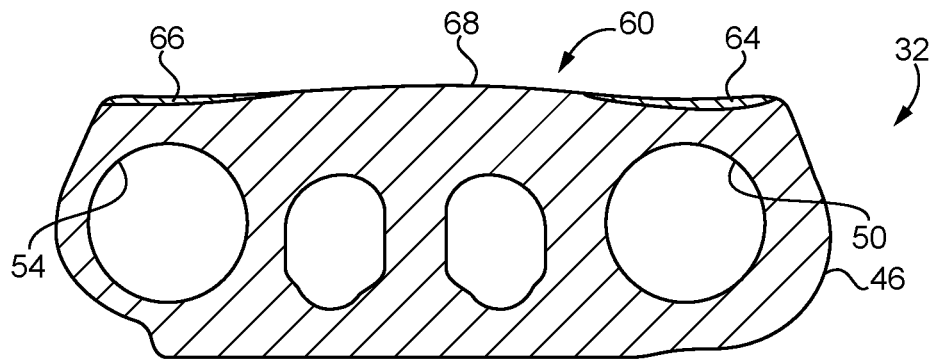
FIG. 4 is a sectioned side diagrammatic view of a track link in a first wear state, according to one embodiment.
Figure 5:
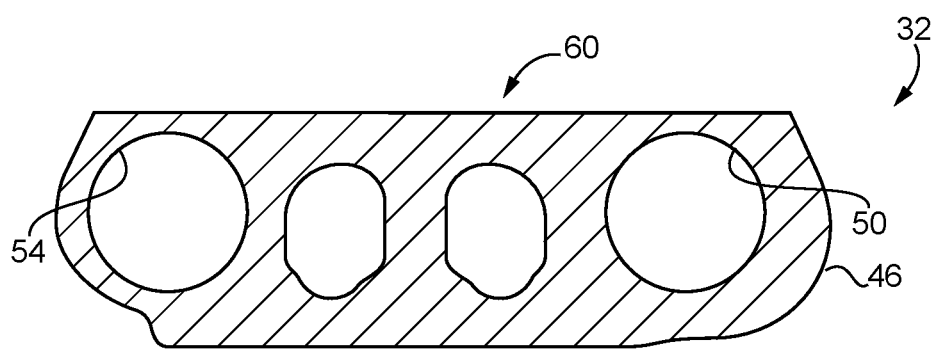
FIG. 5 is a sectioned side diagrammatic view of a track link in another wear state, according to one embodiment.

Referring to the drawings generally, but in particular now to FIGS. 4 and 5, there is shown an elongate link body 46 as it might appear at a first state of wear and a second state of wear, respectively. It will be recalled that softer material of zones 64 and 66 is positioned within the portions of link straps 48 and 52 that form upper rail surface 60, whereas relatively harder material of zone 68 is positioned within the portion of upper rail surface 60 formed by middle section 56. Wearing and shedding of material tends to be most severe toward the center of a track link given the sliding contact that tends to occur between the one or more rotatable idlers and the middle of the track links as the idler engages and disengages with each individual track link. For this reason, placement of softer material toward the ends of the track links can cause wear at those locations to be relatively more rapid than it otherwise might be, compensating for the more severe and rapid wear that occurs closer to the center of the link. In FIG. 4 it can be seen that much of relatively softer zones 64 and 66 has worn away, whereas within relatively harder zone 68 elongate link body 46 has begun to form a slightly elevated profile due to the relatively more wear-resistant, harder material. In a real-world application the specific pattern of wear and the specific link profile that is observed could of course vary significantly from that which is illustrated, and will depend at least in part upon not only the design of the track link but also the substrate materials within which the machine is operated and the manner in which it is used. For instance, different wear patterns can be observed where track-type machines operate to push material up a slope more frequently than they operate to push material downslope, different wear patterns can be expected for side-hilling operation in comparison to flat-ground operation, et cetera. Regardless, it can be expected that scalloping of the track link will be less severe, or even an opposite effect to scalloping observed at least initially, where the relatively softer material is placed at the ends or toward the ends of the track link versus hard material in the center, according to the present disclosure. In FIG. 5, there is shown a still later wear stage approximately as elongate link body 46 might appear when track link 32 has approached or reached an end of its service life. It can be seen at this stage that upper rail surface 60 is substantially flat, having shed material after the state depicted in FIG. 4 at a relatively greater rate toward the center of elongate link body 46, with shedding of material toward the ends of elongate link body 46 having slowed with the consumption of the last of the relatively softer material.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A track link for a ground-engaging track system in a machine comprising:
    an elongate link body including a first link strap having a track pin bore formed therein, a second link strap having a bushing bore formed therein, and a middle section connecting between the first link strap and the second link strap;
    the elongate link body further including a lower shoe-mounting surface, and an upper rail surface, the upper rail surface being located in part upon each of the first link strap, the second link strap, and the middle section, and formed by a wear band of sacrificial wear material;
    the sacrificial wear material having a hardness that is varied lengthwise along the upper rail surface to form a first relatively softer zone located in the first link strap and including a softer material exposed on the upper rail surface, a second relatively softer zone located in the second link strap and including the softer material exposed on the upper rail surface, and a relatively harder zone located at least in part within the middle section and including a harder material exposed on the upper rail surface;
    the sacrificial wear material having a hardness that is varied depthwise from the upper rail surface; and
    the wear band is formed of the harder material outside of the first relatively softer zone and the second relatively softer zone, such that the harder material extends depthwise between the first relatively softer zone and the track pin bore and depthwise between the second relatively softer zone and the bushing bore.

2. The track link of claim 1 wherein the relatively harder zone extends into each of the first link strap and the second link strap.

3. The track link of claim 2 wherein the relatively harder zone is continuous.

4. The track link of claim 3 wherein a lengthwise extent of the relatively harder zone within each of the first link strap and the second link strap is about 20% or less of a full length of the upper rail surface within the corresponding first or second link strap.

5. The track link of claim 1 wherein each of the first lower hardness zone and the second lower hardness zone has a trough shape.

6. The track link of claim 5 wherein the second link strap includes an end band, and the wear band extends downward to a boundary that is spaced a distance from the bushing bore that is not less than a thickness of the end band.

7. The track link of claim 6 wherein each of the first lower hardness zone and the second lower hardness zone defines a trough depth from the upper rail surface that is less than a depth of the boundary from the upper rail surface.

8. The track link of claim 1 wherein the first link strap is laterally offset from the second link strap such that the elongate link body forms an S-pattern.

9. The track link of claim 8 wherein the upper rail surface is flat.

10. A track joint assembly for a ground-engaging track system in a machine comprising:
    a first track link;
    a second track link;
    a track pin coupling the first track link to the second track link;
    each of the first track link and the second track link including a first link strap having a track pin bore formed therein, a second link strap having a bushing bore formed therein, and a middle section connecting between the first link strap and the second link strap;
    each of the first and the second track links further including a lower shoe-mounting surface, and an upper rail surface, the upper rail surface being located in part upon each of the corresponding first link strap, second link strap, and middle section, and formed by a wear band of sacrificial wear material;

the sacrificial wear material having a hardness that is varied lengthwise along the upper rail surface of the corresponding first or second track link to form a first relatively softer zone of a softer material located in the first link strap, a second relatively softer zone of the softer material located in the second link strap, and a relatively harder zone of harder material located at least in part within the middle section; and the sacrificial wear material having a hardness that is varied depthwise from the upper rail surface in the corresponding first or second track link, such that the softer material has a greatest depth from the upper rail surface at a location longitudinally between the middle section and an outer end of the respective first link strap or second link strap, and is progressively reduced in depth, from the location of greatest depth, in longitudinal directions toward each of the middle section and the outer end of the respective first link strap or second link strap.

11. The track joint assembly of claim 10 wherein the first link strap is laterally offset from the second link strap in each of the first and the second track link so as to form an S-pattern.

12. The track joint assembly of claim 10 wherein a gap extends between the first link strap of the first track link and the middle section of the second track link, and the relatively harder zone of the second track link extends into the corresponding second link strap such that relatively harder sacrificial wear material of the second track link is located adjacent to the gap.

13. The track joint assembly of claim 12 wherein a roller contact width of the upper rail surface in the middle section is about twice a roller contact width of the upper rail surface in each of the first and the second link straps.

14. The track joint assembly of claim 10 wherein the upper rail surface is flat.

15. The track joint assembly of claim 14 wherein each of the first lower hardness zone and the second lower hardness zone has a trough shape.

16. A track link for a ground-engaging track system in a machine made according to a method comprising:

heat treating an elongate link body having a first link strap, a second link strap, a middle section, and an upper rail surface, such that a material extending throughout the elongate link body is hardened to form a harder material;

tempering the elongate link body such that a portion of the material that forms the upper rail surface is softened to form a softer material;

forming, by way of the heat treating and the tempering of the elongate link body, a scallop-retarding pattern of material hardness that is varied lengthwise along the upper rail surface; and the scallop-retarding pattern of material hardness forming relatively softer zones of the softer material in each of the first and the second link straps, a relatively harder zone in the middle section of the harder material, and a wear band of the harder material extending lengthwise between an outer end of the first link strap and an outer end of the second link strap and depthwise between the relatively softer zones and a first bore in the first link strap and a second bore in the second link strap, respectively.

17. The track link of claim 16 wherein the forming of a scallop-retarding pattern of material hardness further includes forming a relatively harder zone that is continuous and extends into the first and the second link straps.

18. The track link of claim 17 wherein the heat treating of the elongate link body further includes hardening the material to a hardness greater than 50 HRC, and the tempering of the elongate link body further includes tempering the elongate link body such that the portion of the material that forms the upper rail surface is softened from the hardness greater than 50 HRC to a hardness less than 50 HRC.

19. The track link of claim 18 wherein the tempering of the elongate link body further includes tempering the elongate link body by way of electromagnetic induction tempering of the upper rail surface within the first and the second link straps.

* * * * *